United States Patent
Sawada et al.

[11] Patent Number: 6,018,357
[45] Date of Patent: *Jan. 25, 2000

[54] LED PRINTER AND DRIVE METHOD HAVING AN ENERGY DISTRIBUTION FLATTENING FUNCTION

[75] Inventors: Hideki Sawada; Hiromi Ogata; Hideo Taniguchi, all of Kyoto, Japan

[73] Assignee: Rohm Co., Ltd., Kyoto, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/473,898

[22] Filed: Jun. 7, 1995

Related U.S. Application Data

[63] Continuation of application No. 08/038,649, Mar. 29, 1993, abandoned.

[30] Foreign Application Priority Data

| Apr. 3, 1992 | [JP] | Japan | 4-082488 |
| Apr. 9, 1992 | [JP] | Japan | 4-088592 |
| Feb. 3, 1993 | [JP] | Japan | 5-016507 |

[51] Int. Cl.$^7$ .............. G01D 9/42; B41J 2/47; B41J 2/435; B41J 2/45
[52] U.S. Cl. .......................... 347/237; 347/238
[58] Field of Search .................. 347/237, 238, 347/130

[56] References Cited

U.S. PATENT DOCUMENTS

| 4,074,319 | 2/1978 | Goldschmidt et al. | 358/302 X |
| 4,706,130 | 11/1987 | Yamakawa | 346/154 X |
| 4,807,047 | 2/1989 | Sato et al. | 346/107 R X |
| 4,905,027 | 2/1990 | Itoh | 346/154 X |
| 4,918,462 | 4/1990 | Tomita et al. | 347/237 |
| 4,956,684 | 9/1990 | Urata | 346/107 R X |
| 5,172,134 | 12/1992 | Kishida et al. | 346/1.1 |

FOREIGN PATENT DOCUMENTS

| 62-136956 | 6/1987 | Japan . |
| 63-199657 | 8/1988 | Japan . |
| 63-272561 | 11/1988 | Japan . |
| 1-27945 | 1/1989 | Japan | 347/240 |
| 1-139280 | 5/1989 | Japan . |
| 4-70160 | 3/1992 | Japan . |

*Primary Examiner*—N. Le
*Assistant Examiner*—Thinh Nguyen
*Attorney, Agent, or Firm*—Fish & Richardson, P.C.

[57] ABSTRACT

A printer including a light emitting body for emitting light along a main scanning direction. A photosensitive surface of a photosensitive body is sensitized by the light emitted from the light emitting body. The photosensitive surface is moved relative to the light emitting body at a predetermined distance along a sub scanning direction perpendicular to the main scanning direction. While the photosensitive surface is moved at the predetermined distance along the sub scanning direction, the light emitting body emits the lights at a predetermined period. The predetermined period is determined to be a time required for moving the photosensitive surface at a dimension of the light emitting body along the sub scanning direction.

17 Claims, 9 Drawing Sheets

LED PRINTER AND DRIVE METHOD HAVING AN ENERGY DISTRIBUTION FLATTENING FUNCTION

This application is a continuation of U.S. application Ser. No. 08/038,649, filed Mar. 29, 1993, now abandoned.

BACKGROUND OF THE INVENTION i) Field of the Invention

The present invention relates to an LED (light emitting diode) printer for sensitizing a photosensitive body surface by the light emitting operation of an LED array for use in a facsimile machine, a printer or the like, and a driving control method of its LED array in the printer.

ii) Description of the Related Arts

Conventionally, an LED printer is known. The LED printer is a printer provided with an LED array and a photosensitive body. The LED array is driven by an LED array chip (driver IC) on the basis of externally supplied data. This data represents a print pattern to be formed on the surface of the photosensitive body. A plurality of LED elements constituting the LED array selectively emit light according to this data. The emission duty cycle of each LED element is determined by, for example, a strobe signal. When the LED array emits light in this manner, the surface of the photosensitive body is sensitized. Hence, according to the data supplied to the LED array, the image pattern to be formed on the surface of the photosensitive body is determined.

The photosensitive body usually has a drum form. This photosensitive drum is rotated at a predetermined peripheral velocity. With the rotation of the photosensitive drum, the photosensitive portion formed on the surface of the photosensitive drum is moved along the peripheral direction of the photosensitive drum.

Further, the LED array is composed of a plurality of LED elements arranged in parallel. With the rotation of the photosensitive drum, the LED array is arranged in parallel along the direction (the longitudinal direction of the photosensitive drum) perpendicular to the moving direction of the photosensitive drum surface (the peripheral direction of the photosensitive drum). This arranging direction, that is, the longitudinal direction of the photosensitive drum is referred to as a main scanning direction and the moving direction of the photosensitive body surface (the peripheral direction of the photosensitive drum) is referred to as a sub-scanning direction.

When one line is printed by the LED printer, while the data representing the image pattern along the main scanning direction are given to the driver IC, the photo-sensitive body surface is moved in the sub-scanning direction (that is, the rotary drum is rotated). At this time, since the LED elements constituting the LED array continuously emit the light for a predetermined time, conventionally, the energy distribution along the subscanning direction on the photosensitive body surface becomes a convex form, and therefore the dot appearance is bad.

Further, with the rotation of the photosensitive drum, since the photosensitive body surface is moved relative to the LED array, in general, the sensitized area of the photosensitive body surface by the LED element of the single dot (hereinafter referred to as a light emission area per one dot of the LED element) is fixed. When characters, symbols or the like are printed, smoothness of an outline is limited by the light emission area per one dot (see FIGS. 10 and 14).

Since the light emission area per one dot is fixed, for improving the smoothness of the outline by the LED printer, a certain fixed limitation is present.

SUMMARY OF THE INVENTION

It is therefore an object of the present invention to provide an LED printer and drive control method thereof in view of the problems of the prior art, each of which is capable of flattening an energy distribution along a subscanning direction on a photosentitive body surface.

It is another object of the present invention to provide an LED printer and drive control method thereof each of which is capable of adjusting a light emission area per one dot to achieve a smooth outline.

A printer according to the present invention, comprises:

a) a light emitting body for emitting light in a first direction;

b) a photosensitive body having a photosensitive surface to be sensitized by the light emitted by the light emitting body, the photosensitive surface being moved relative to the light emitting body in a second direction perpendicular to the first direction; and c) means for controlling the light emitting operation of the light emitting body so as to repeat the light emitting operation a predetermined number of times at a predetermined period while the photosensitive surface is moved at a predetermined distance along the second direction relative to the light emitting body, said period being set at a time required for moving the photosensitive surface at a dimension along the second direction relative to the light emitting body.

A driving method of a light emitting body in a printer according to the present invention is a method which comprises the steps of:

a) causing the light emitting body to emit light; and b) repeating said step a) a predetermined number of times at a predetermined period while the photosensitive surface is moved at a predetermined distance along the second direction relative to the light emitting body;

said period being set at a time required for moving the photosensitive surface at a dimension of the light emitting body along the second direction relative to the light emitting body.

According to the present invention, the light emitting operation of the light emitting body is repeated at the predetermined period set as described above, while the photosensitive surface is moved the predetermined distance. Hence, the respective energy spatial distributions along the second direction, given on the photosensitive surface from the light emitting body during corresponding light emitting operation are synthesized and the total of the energy spatial distribution along the second direction, given on the photosensitive surface from the light emitting body in all the light emitting operations is obtained. Since the feed portions of the individual energy distributions are added, the resulting total distribution becomes flat in comparison with the continuous light emitting operation in the prior art. Hence, a printer having a better dot appearance is realized.

Further, although only one light emitting operation is carried out while the photosensitive surface is moved at the predetermined distance relative to the light emitting body in the conventional printer, a plurality of light emitting operations are performed in the present invention. In a preferred embodiment of the present invention, the light emitting operations are selectively allowed or inhibited. By carrying out such a light emitting control, the photosensitive area of the photo-sensitive body along the second direction can be divided into a plurality of parts. Hence, according to the present invention, a smooth outline can be obtained.

Further, the dimension along the second direction of the light emitting body is sufficiently short compared with the dimension along the first direction, for instance, it is sufficient to determine the former to ½ of the latter. By determining the dimension along the second direction to be short in this manner, the light emitting operation of the light emitting body can be repeated many times while the photosensitive surface of the photosensitive body is moved relative to the light emitting body at the predetermined distance. This further enhances the flattening effect of the energy distribution along the second direction on the photosensitive surface. Also, in addition to dividing of the photosensitive surface into a plurality of parts, by realizing this light emitting control, the smoothing effect of the outline can be enhanced.

When the present invention is carried out, a variety of embodiments can be adopted. For example, as the light emitting body, the LED array having a plurality of LEDs aligned in the first direction can be used. Also, the photosensitive body can be implemented as a photosensitive drum of cylindrical form. When the photosensitive drum is used as the photosensitive body, the predetermined distance of the movement of the photosensitive surface relative to the light emitting body in the second direction corresponds to the dot pitch.

When the present invention is constructed as the LED printer, the printer comprises:

a) an LED array having a plurality of LEDs aligned along a main scanning direction;

b) a photosensitive body having a photosensitive surface to be sensitized by light emitted by the LEDs, the photosensitive surface being moved relative to the LED array in a sub scanning direction perpendicular to the main scanning direction, c) a driver circuit including:
  c1) means for converting serial data representing a printing pattern along the main scanning direction into parallel data at a predetermined rate;
  c2) means for latching the parallel data depending on a latch signal;
  c3) means for allowing the LEDs to selectively emit light on the basis of the latched parallel data; and
  c4) means for either allowing an execution of the selective light emitting operation when a strobe signal is supplied or inhibiting the execution of the selective light emitting operation when the strobe signal is not supplied; and d) means for controlling the light emitting operations of the LED array by supplying at least the latch signal and the strobe signal to the driver circuit at a predetermined timing, the control means generating the strobe signal predetermined number of times at a predetermined period while the photosensitive body is moved at the predetermined distance with respect to the LED array, the predetermined period being a time required for moving the photosensitive surface with respect to the LED array at a dimension along the LED array.

In this embodiment, the above-described first and second directions are dealing with the main and sub-scanning directions, respectively. Also, the light emitting operation of the LED array functioning as the light emitting body is directly driven by the driver circuit. Since the operation of the driver circuit is controlled by the control means, the light emitting operation of the LED array is controlled by the control means.

The operation of this embodiment is as follows. First, when the serial data are supplied to the driver circuit from, for example, the control means, the serial/parallel conversion means converts the serial data into the parallel data at the predetermined rate. The serial data to be converted represent the printing pattern along the main scanning direction. Hence, the parallel data obtained by the serial/parallel conversion means are the data capable of realizing the above-described printing pattern on the photosensitive surface along the main scanning direction by supplying the parallel data to the LED array at the same time so as to emit the light.

The latch means latches the parallel data obtained by the serial/parallel conversion means depending on the latch signal supplied from the control means. The light emitting selection means selectively allows the LEDs to emit the light on the basis of the latched parallel data. At this time, the light emission allow/inhibit means allows the execution of the above-described selective light emitting operation when the strobe signal is supplied, and inhibits the same when the signal is not supplied. Hence, the light emitting duty of the LEDs to be driven is determined by the duty of cycle the strobe signal.

The control means realizes the control concerning the feature of the present invention in the LED printer by using the strobe signal. That is, the control means generates the strobe signal for predetermined times at the predetermined points during the moving of the photosensitive body relative to the LED array at the predetermined distance. This period is the time required for moving the photosensitive surface relative to the LED array at the dimension along the LED array. The control means supplies the strobe signal at the predetermined timing.

When such a control is performed, the energy distribution finally obtained on the photosensitive surface along the sub scanning direction, that is, the synthesized distribution, becomes flat compared with the conventional energy distribution obtained by the single light emitting operation without carrying out the repeated generation of the strobe signal.

Further, it is assumed that a time required for moving the photosensitive surface relative to the light emitting body along the sub scanning direction at the above-described predetermined distance is called one line printing period. In this embodiment, the printing operation per one line is divided into a plurality of times by the repeated generation of the strobe signal. Hence, this can be applied to the smoothing of the outline. That is, by generating the latch signal in synchronism with the strobe signal while the serial data are supplied in synchronism with the strobe signal, the one-line printing using the serial data for a plurality of lines is performed. This means dividing the light emitting area per one LED into a plurality of area adjusting elements. Hence, the light emitting area per one LED is not restricted by the dot area, and as a result, the outline can be smoothed.

BRIEF DESCRIPTION OF THE DRAWINGS

The objects, features and advantages of the present invention will become more apparent from the consideration of the following detailed description, taken in conjunction with the accompanying drawings, in which.

DETAILED DESCRIPTION OF THE PREFERRED EMBODIMENTS

The present invention will now be described in connection with its preferred embodiments with reference to the attached drawings, wherein like reference characters designate like or corresponding parts throughout the views and thus the repeated description thereof can be omitted for brevity.

Basic Construction of Embodiment

Figure 1:
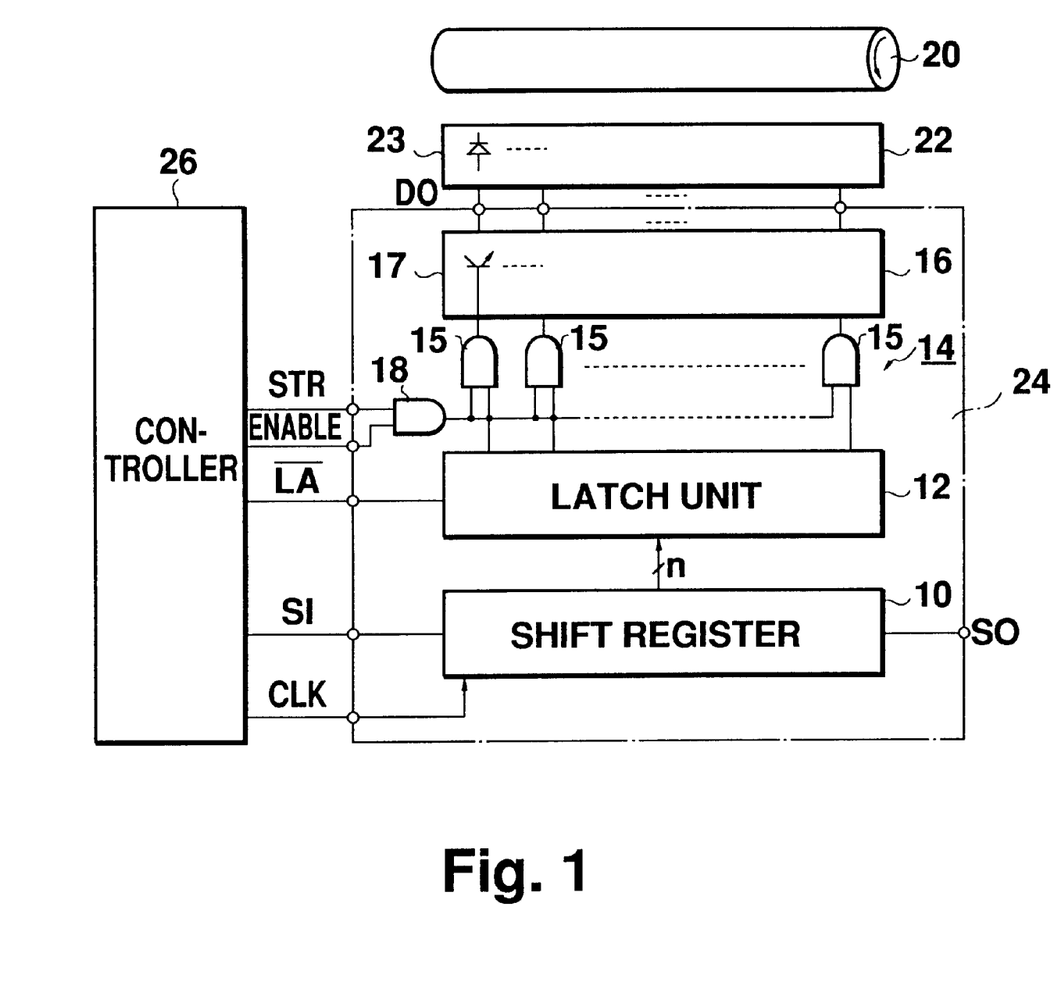
FIG. 1 is a block diagram of one embodiment of an LED printer according to the present invention.

In FIG. 1, there is shown one embodiment of an LED printer according to the present invention. The LED printer is comprised of a photosensitive body 20 constructed as a photosensitive drum having a cylindrical form, an LED array 22 as a means for sensitizing the surface of the photosensitive body 20, a driver integrated circuit (herein after referred as a drive IC) 24 for driving the LED array 22, and a controller 26 for controlling the driver IC 24.

The driver IC 24 includes a shift register 10, a latch unit 12, an AND group 14, an output unit 16 and an AND circuit 18.

The shift register 10 is a means for converting n (n: a plural number) bits of serial data SI into parallel data. The serial data SI are data for representing one line of print pattern, and the shift register 10 carries out a bit shift of this serial data SI by using a clock CLK to perform the serial/parallel conversion. The shift register 10, for example, can be implemented by an n number of flip-flops connected in cascade, and the clock CLK is given to each flip-flop. Thus, the outputs of the flip-flops are supplied as the parallel data to the latch unit 12.

In this case, SO are overflowed serial data output from the shift register 10. By using this data output function, the serial data SO output from the driver IC in a front stage can be supplied as the serial data SI to the driver IC in a rear stage. By constructing in this manner, a system structure capable of obtaining 2n bits of output, 3n bits of output or the like can be made possible.

Also, the latch unit 12 latches the output of the shift register 10 according to a latch signal LA and supplies the same to the AND group 14. The latch unit 12, for example, can be implemented by an n number of latch circuits connected in cascade so as to latch the outputs of the corresponding flip-flops constituting the shift register 10.

Further, when an enable signal ENABLE is on, the AND circuit 18 outputs a strobe signal STR, the enable signal ENABLE allows or inhibits passing of strobe signal STR to the AND group 14 via the AND circuit 18, and the AND circuit 18 acts as a gate for allowing or inhibiting passing of the strobe signal STR depending on the enable signal ENABLE.

The AND group 14 is composed of an n number of AND circuits 15. Each AND circuit 15 possesses at least two input terminals. To one input terminal of the AND circuit 15, the corresponding bit of the output of the latch unit 12 is input, and to another input terminal, the output of the AND circuit 18 is input. As described above, when the latch unit 12 includes the n number of latch circuits, the AND circuits 15 input the outputs of the corresponding latch circuits of the latch unit 12.

Hence, when the enable signal ENABLE is off, the n bits of parallel outputs of the AND group 14 are all off. On the contrary, in the on state of the enable signal ENABLE, the n bits of parallel outputs of the AND group 14 are the same value as the outputs of the latch unit 12 during the period that the strobe signal STR is on, but are all off during the period that the strobe signal STR is off.

The output unit 16 can be composed of, for example, an n number of transistors 17 to be controlled by the outputs of the AND circuits 15. Although the transistors 17 are composed of bipolar transistors as shown in FIG. 1, of course, other kinds of driving elements such as FETs or the like can be used. The output DO of the output unit 16 is supplied to the LED array 22.

The LED array 22 is an array including an n number of LEDs 23. Each LED 23 emits light in response to the output of the corresponding one of the transistors 17 with respect to the n number of bits of the output DO of the output unit 16 so as to sensitize the photosensitive surface of the photosensitive body 20.

The photosensitive body 20 is rotated in a direction indicated by an arrow shown in FIG. 1. Since the above-described main scanning direction is the arranging direction of the LEDs 23 in the LED array 22, a sensitized pattern depending on the serial data SI is formed on the photosensitive surface of the photosensitive body 20 along the main scanning direction. Also, the sub scanning direction is the rotation direction of the photosensitive body 20.

Figure 2:
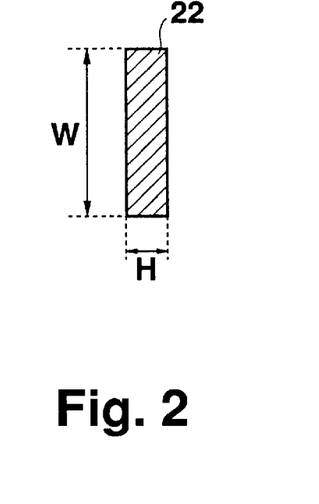
FIG. 2 is an elevational view showing a dimension of a light emitting body used in an LED printer according to the embodiment.

This embodiment is characterized by mainly a drive method of the driver IC 24 and a dimension setting of the LED array 22. In FIG. 2, there is shown the latter.

As shown in FIG. 2, in this embodiment, the light emitting body dimension of the LED array 22 is determined so as to be long in the main scanning direction. More specifically, assuming that the dimensions in the main and sub scanning directions of the light emitting body of the LED array 22 are W and H, respectively, the ratio between both the dimensions is determined to $H/W<\frac{1}{2}$. In this case, the "light emitting body" dimension of the LED array 22 is a dimension of the part for actually sensitizing the photosensitive surface of the photosensitive body 20 in the LED array 22, that is, an effective dimension when the LED array 22 is considered as a light source.

Also, the control method of the driver IC 24 in this embodiment is characterized by switching on/off the strobe signal STR a plurality of times within one SLT and determining the period t of the strobe signal STR to the time required for moving the surface of the photosensitive body 20 at the dimension H. For the realizing of these features, that is, the applications of this embodiment, there are a plurality of methods.

Next, the specific applied examples of this embodiment will now be described. In the system and method of this embodiment, an applied example for improving the dot appearance and another applied example for smoothing an outline will be described.

First Applied Example—Improvement of Dot Appearance

Figure 3:
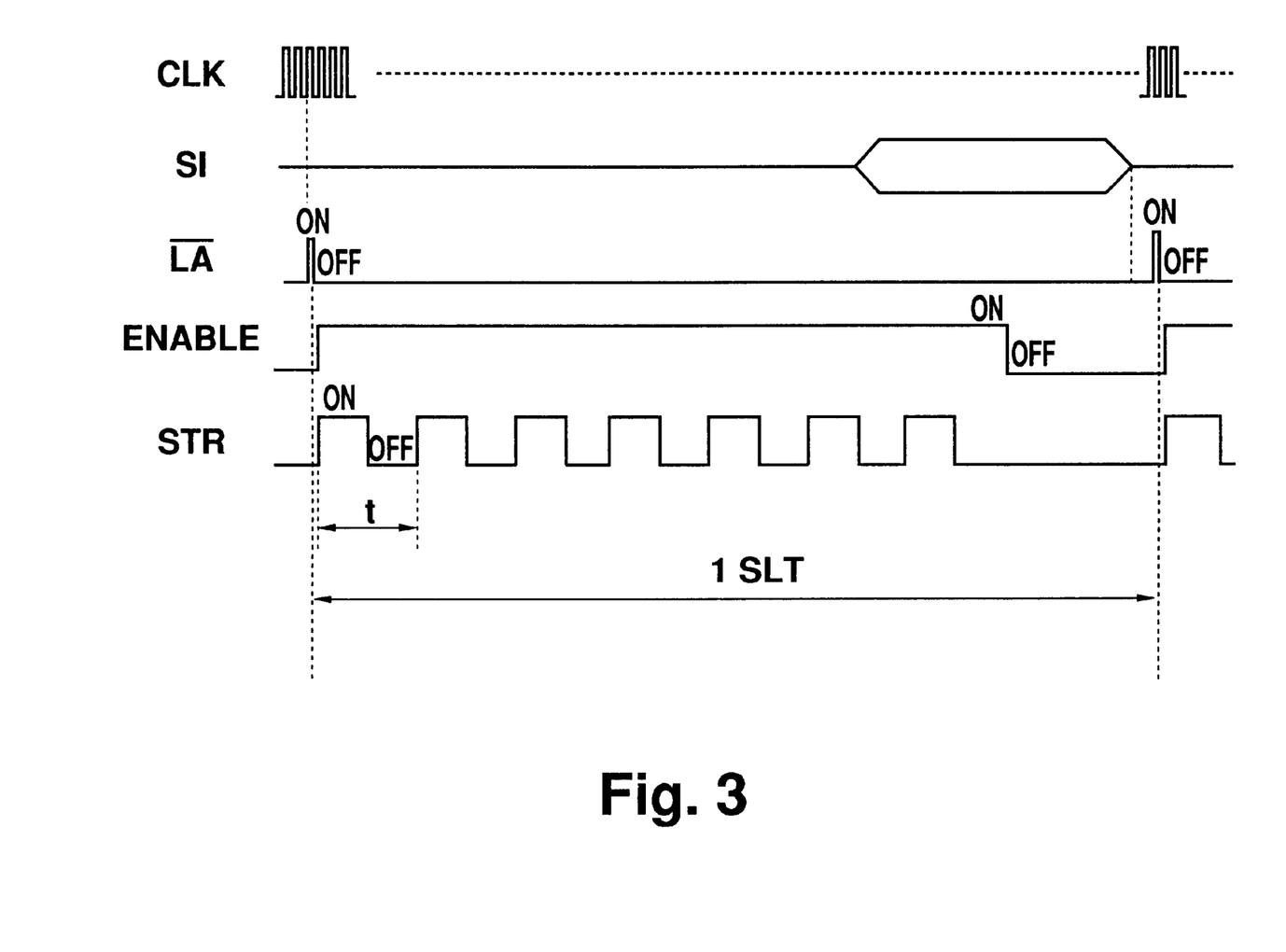
FIG. 3 is a timing chart showing a driver IC drive timing in one example of an LED printer according to the embodiment.

In FIGS. 3 to 6, there is shown the first applied example of this embodiment. First, FIG. 3 shows the timings of the signals output from the controller 26. In FIG. 1, circuits for controlling the driver IC 24 are designated together as the controller 26. Since it is sufficient for the controller 26 to be able to output the signals at the timings shown in FIG. 3, there is no need to construct the controller 26 in an integrated form as shown in FIG. 1.

The controller 26 inputs the serial data SI representing a pattern (characters and the like) to be printed on one line per one SLT (scanning line time) at a predetermined timing. The serial/parallel conversion of the serial data SI is carried out by the shift register 10 according to the clock CLK supplied from the controller 26. After finishing the serial/parallel conversion of the serial data SI, the controller 26 turns on the latch signal LA, and the parallel data as a result of the serial/parallel conversion are latched in the latch unit 12. The controller 26 switches off the enable signal ENABLE prior to the turning on the latch signal LA. Hence, the strobe signal STR is not input to the AND group 14 while the latch unit 12 latches the parallel data output from the shift register 10. Accordingly, the timing of the above-described latch is different from that of the output described hereinafter.

The timing for giving the output DO to the LED array 22 from the output unit 16, that is, the output timing is started after the latch signal LA is turned off. That is, after the latch signal LA is turned off from the on state, the controller 26 executes a periodic generating operation of the strobe signal STR, which is a feature of this example. More specifically, after switching off the latch signal LA, the controller 26 turns on the enable signal ENABLE to allow the output and also turns on the strobe signal STR in synchronism with the turning on the enable signal ENABLE. Then, the controller 26 turns on/off the strobe signal STR a predetermined number of times at a predetermined period t. After finishing the predetermined times of the on/off operations of the strobe signal STR, the controller 26 turns off the enable signal ENABLE.

Therefore, in this applied example, the output of the data from the output unit 16 to the LED array 22 and the formation of the sensitized pattern on the photosensitive surface of the photosensitive body 20 can be divisionally executed in a plurality of periods that the strobe signal STR is turned on. In other words, the strobe signal STR functions as a switching pulse for determining a light emitting time interval of the LED array along the sub scanning direction.

Also, in this applied example, the switching period t of the strobe signal STR is determined to the time required for moving the surface of the photosensitive body 20 at the dimension H as follows.

Figure 4:
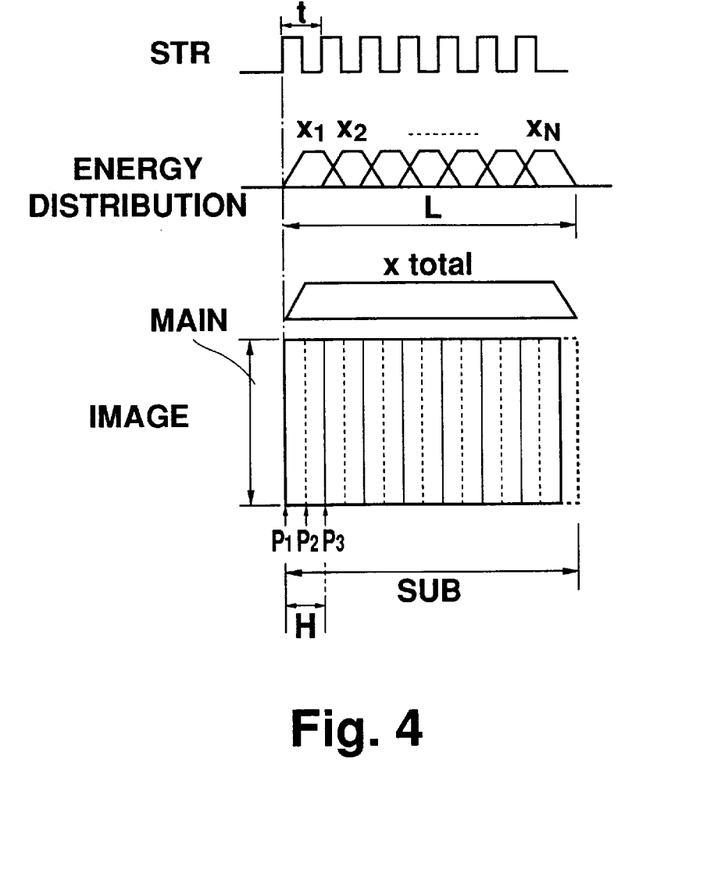
FIG. 4 a graphical representation showing a strobe signal waveform, an energy spacial distribution on a photosensitive surface of a photosensitive body, a synthesized distribution, and an image formation operation in the example shown in FIG. 4.

First, as shown in FIG. 4, assuming that the strobe signal STR is switched on at a time point when the sub scanning direction relative positions of the surface of the photosensitive body 20 to the light emitting body of the LED array 22 are located in $P_1$, then the LED array 22 starts the light emitting operation. Hence, the energy spatial distribution $x_1$ given to the surface of the photosensitive body 20 by the light emitting body of the LED array 22 starts to rise up when the strobe signal STR turns on and gradually rises up until the strobe signal STR is switched off. After this rising up, the distribution $x_1$ reaches its peak. The peak period continues for a period equal to an on-period of the strobe signal STR. That is, the peak period continues after the strobe signal STR turns off, since the LEDs have delay. In this case, $P_2$ is the sub scanning direction positions of the surface of the photosensitive body 20 relative to the light emitting body of the LED array 22 at the time point when the strobe signal STR is switched off, and is a position moved by H/2 from the position $P_1$. After the peak period of distribution $x_1$, the distribution $x_1$ gradually decreases.

Then, at the time point when the strobe signal STR is switched on again, with the rotation of the photosensitive body 20, the surface of the photosensitive body 20 is further moved, and the sub scanning direction relative position becomes $P_3$. The energy spatial distribution $x_2$ given to the surface of the photosensitive body 20 by the light emitting body of the LED array 22 until the strobe signal STR is switched off becomes similar to the distribution $x_1$.

Such an on/off operation of the strobe signal STR is repeated a predetermined number of times N during the printing period of one line. In this case, as described above, the period t of the strobe signal STR is determined to the time for moving the surface of the photo-sensitive body 20 at the sub scanning direction dimension H. Hence, the peaks of the distributions $x_1$, $x_2$ . . . , $x_N$ are not overlapped and only the base portions are overlapped. In the base overlapped portions, the energy distribution is summed up to be flat, and thus the total energy distribution×total of the distributions $x_1$, $x_2$ . . . , $x_N$ given to the surface of the photosensitive body 20 becomes a flat energy distribution.

Figure 5:
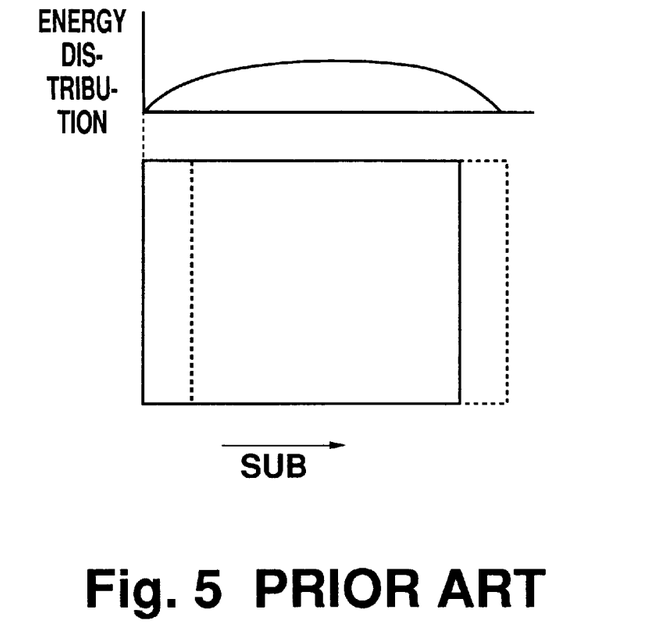
FIG. 5 is a graphical representation showing an energy distribution along a sub scanning direction, obtained in a conventional LED printer.
Figure 6:
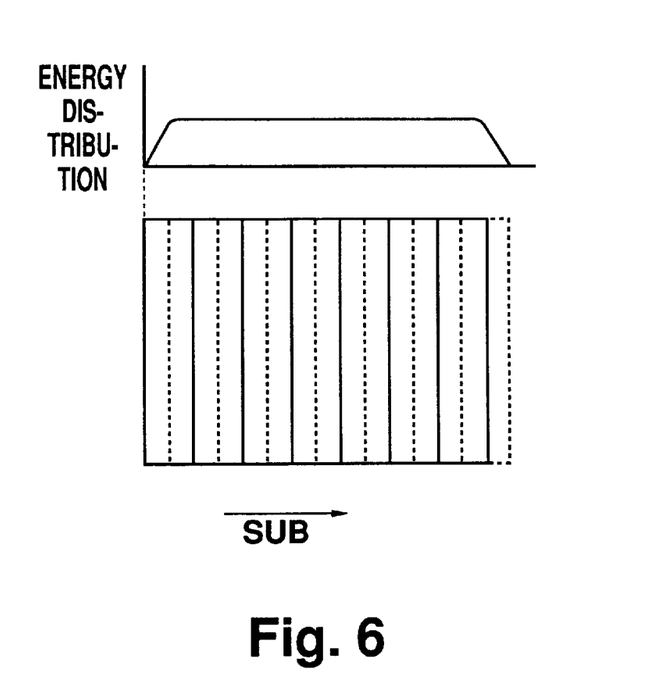
FIG. 6 is a graphical representation showing an energy distribution along a sub scanning direction, obtained in the example shown in FIG. 4.

That is in this applied example, by performing the switching operation of the LED array 22 along the sub scanning direction, as shown in FIG. 6, the uniform energy distribution can be obtained. On the contrary, in a conventional continuous light emitting structure of the LED array along the sub scanning direction, as shown in FIG. 5, only an energy distribution of a convex form can be obtained.

Further, the light emitting body dimension H in the sub scanning direction for determining the on-period of the strobe signal STR is determined to be sufficiently small so that the ratio H/W may be at most ½. Hence, the division number N of the dot pitch L becomes sufficiently large. This shows that a large number of the distributions expressed as $x_1$, $x_2$ . . . , $x_N$ in FIG. 4 can be synthesized. By finely synthesizing a large number of energy distributions in this manner, the degree of flatness of the total energy distribution×total becomes sufficiently high.

Second Applied Example—Smoothing of Outline

In FIGS. 7 to 17, there is shown an example of this embodiment applied to smoothing an outline. In this applied example, the period t of the strobe signal STR is also determined to be the time for relatively moving the surface of the photosensitive body 20 at the sub scanning direction dimension H with respect to the light emitting body of the LED array 22. Also, the sub scanning direction dimension H is determined to sufficiently small, for example, the ratio H/W is at most ½. In this example, by inputting the serial data SI equivalent to a plurality of lines in the printing of one line, the outline can be smoothed.

Figure 7:
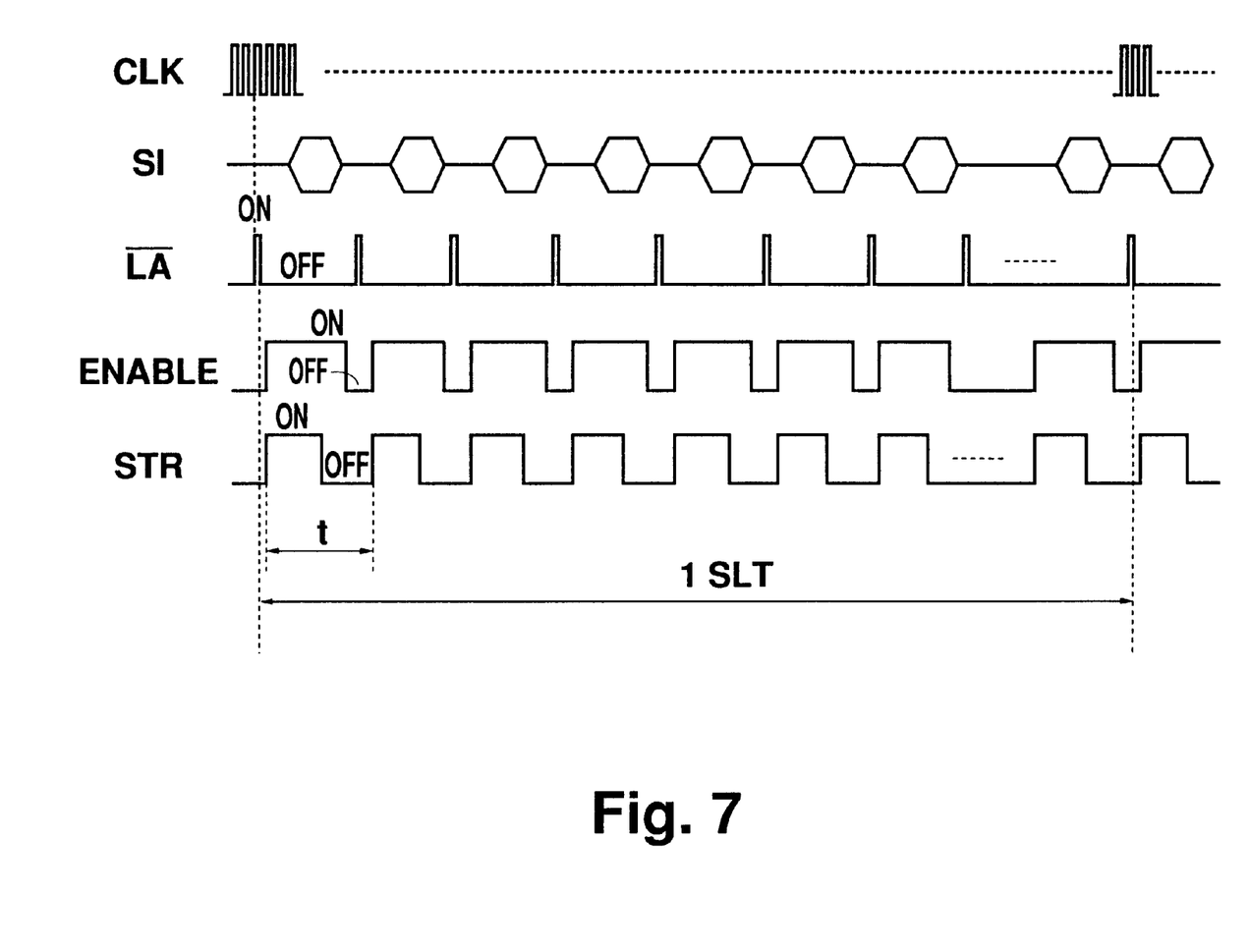
FIG. 7 is a timing chart showing a driver IC drive timing in a second example of an LED printer according to the embodiment shown in FIG. 1.

First, FIG. 7 shows the timings of the signals output from the controller 26. In this case, similar to the first applied example, since it is sufficient for the controller 26 to be able to output the signals at the timing shown in FIG. 7, there is no need to construct the controller 26 in an integrated form as shown in FIG. 1.

The timings shown in FIG. 7 are in common with those shown in FIG. 3 in that the strobe signal STR is turned on/off N (N: a plural number) times within one SLT. However, in this case, the controller 26 supplies the serial data SI representing the pattern (characters and the like) to be printed on one line for N lines within one SLT to the driver IC 24 at a predetermined timing. Also, the controller 26 switches off the enable signal ENABLE turning off the strobe signal STR and switching on the latch signal LA. Hence, in this case, while the serial data SI for the N lines per SLT are used, one line of printing per SLT is carried out.

Figure 8:
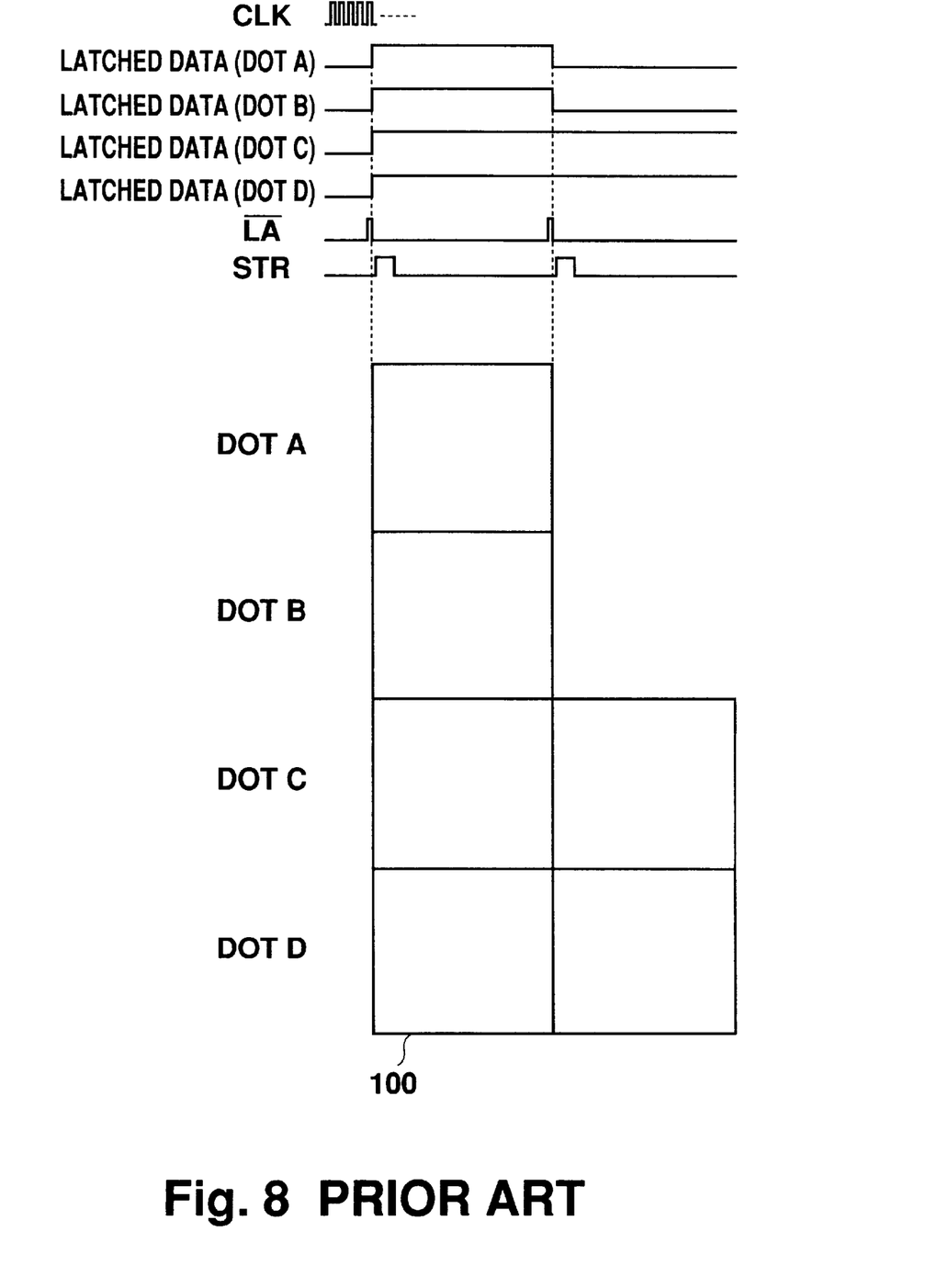
FIG. 8 is a timing chart showing a driver IC drive timing in a conventional LED printer.
Figure 9:
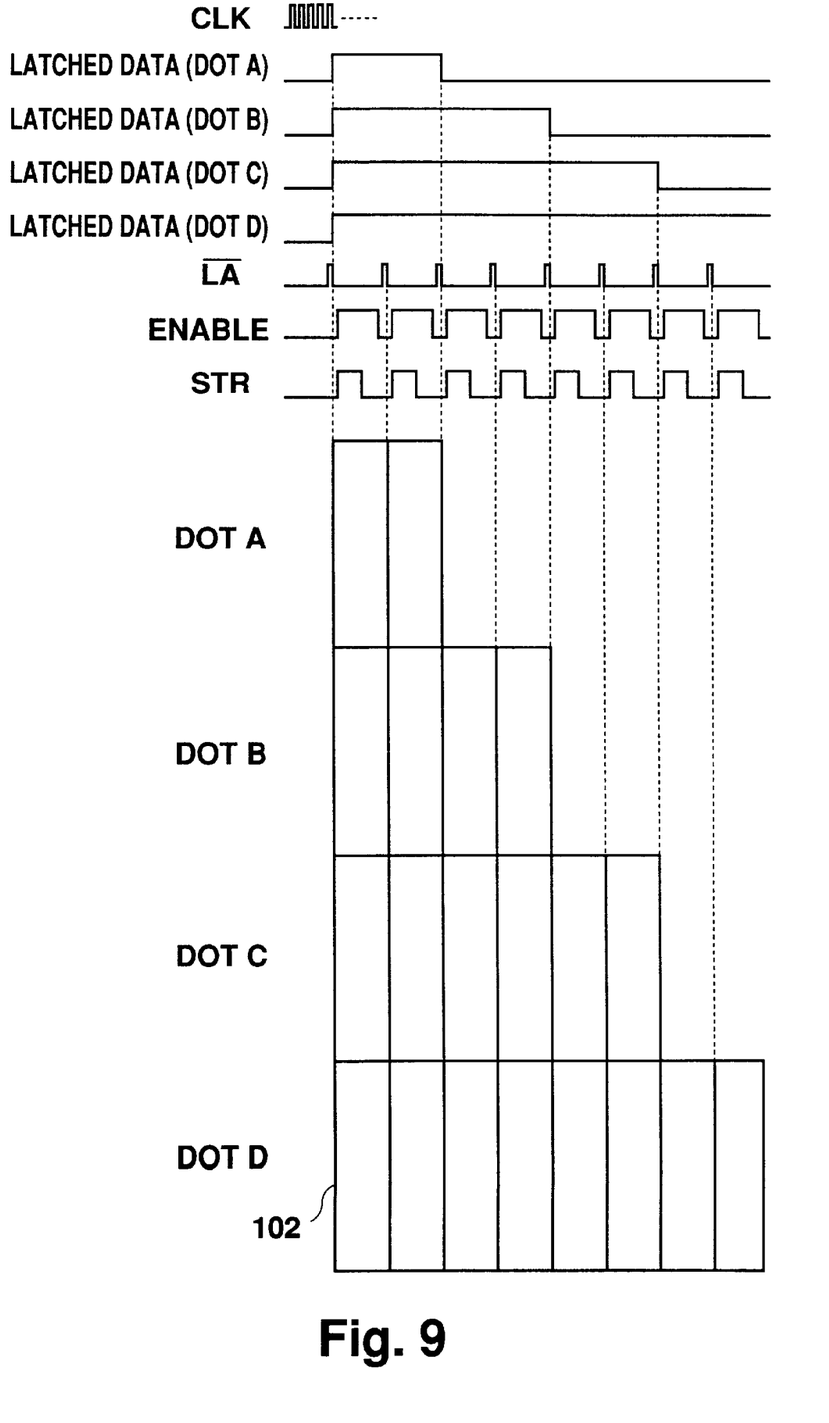
FIG. 9 is a timing chart showing a driver IC drive timing in the second example shown in FIG. 7.

In FIGS. 8 and 9, there are shown driving timings of the driver IC 24. FIG. 8 shows the conventional driving timings and FIG. 9 shows the driving timings in this applied example.

First, as shown in FIG. 8, conventionally, the strobe signal STR is output in only one period per SLT. That is, the strobe signal STR determines only the light emitting period of the LED array 22 in one line printing. In addition, the input of the serial data SI from the controller 26 is performed only once per SLT.

Hence, assuming that the output bit number (thus an arranging number of the LEDs 23 in the main scanning direction) n of the shift register 10 is 4 and the data concerning the bits are A to D as shown in FIG. 8, the printing pattern becomes a pattern composed of a unit of a dot 100.

Different from this, in this case, the strobe signal STR is output in N periods per SLT. Also, the input of the serial data SI from the controller 26 is performed N times per SLT in synchronism with the strobe signal STR.

Thus, assuming that the output bit number n of the shift register 10 is 4 and the data concerning the bits are A to D as shown in FIG. 9, the printing pattern becomes a pattern composed of a unit of an area adjusting element 102.

As described above, in this applied example, since the strobe signal STR is switched on/off in N periods per SLT and the input of the serial data SI from the controller 26 is performed N times per SLT in synchronism with the strobe signal STR, the light emitting area can be finely adjusted compared with the conventional method. On this occasion, since the period t of the strobe signal STR is set to the time required for moving the surface of the photo-sensitive body 20 at the dimension H with respect to the light emitting body of the LED array 22, though a plurality of on-periods of the strobe signal STR within one SLT are settled, the area adjusting elements 102 are not overlapped. Further, since the dimension H is determined to a sufficiently small value, for instance, the ratio H/W is at most ½, an area adjusting element number N per dot can be determined to be sufficiently large.

In this applied example characterized in that one dot 100 is divided into N number of area adjusting elements 102, the outline can be smoothed more. Further, since the area adjusting element number N per dot is determined to a sufficiently large value by setting the dimension H to be sufficiently small, this function is made to be more remarkable. In FIGS. 10 to 17, this operation is shown.

Figure 10:
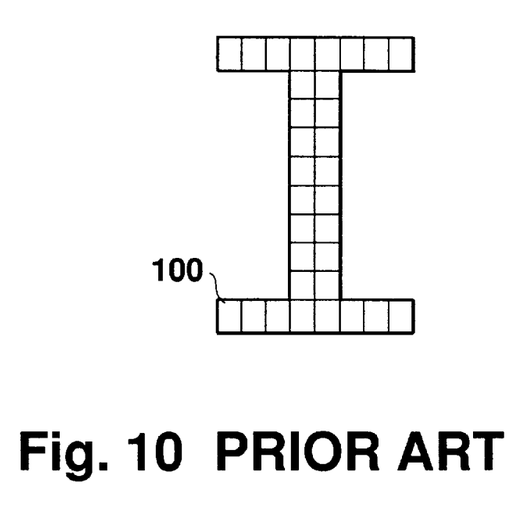
FIG. 10 shows an outline of a letter "I" printed in a conventional apparatus and FIG. 11 is an enlarged view showing a part thereof.
Figure 11:
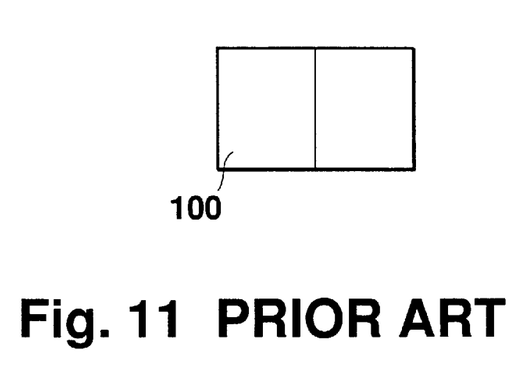
Figure 12:
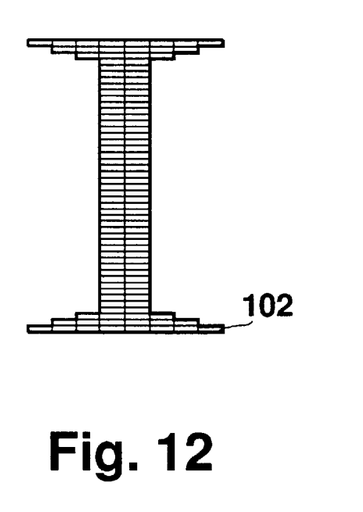
FIG. 12 shows an outline of a letter "I" printed in the example of an apparatus according to the embodiment shown in FIG. 1
Figure 13:
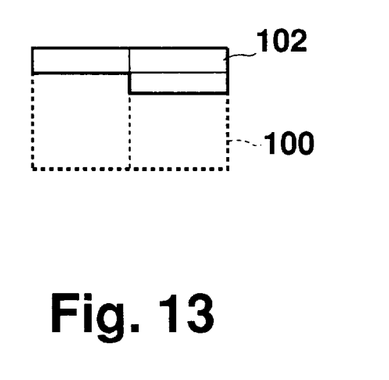
FIG. 13 is an enlarged view showing a part thereof.

For example, when a character or letter "I" is to be printed, conventionally, since the light emitting area per dot 100 is fixed as shown in FIG. 10, the outline can be restricted by the dimension of the dots 100 and thus it is hard to obtain the smooth outline, as shown in magnified scale in FIG. 11. However, in this case, as shown in enlarged scale in FIG. 13, since the area adjusting elements 102 within one dot 100 can be selectively light-emitted, the outline can thus be smoothed, as shown in FIG. 12.

Figure 14:
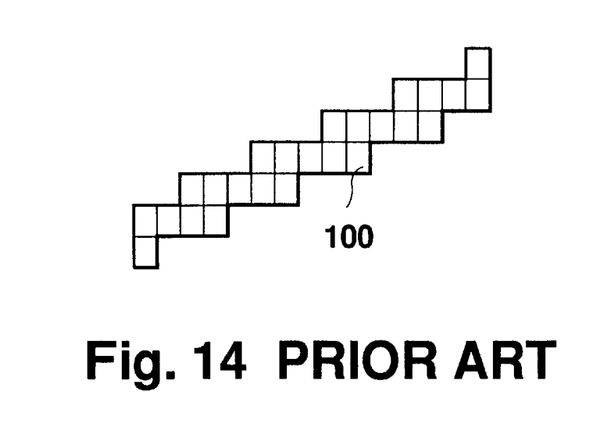
FIG. 14 shows a slant ruled line printed in a conventional apparatus.
Figure 15:
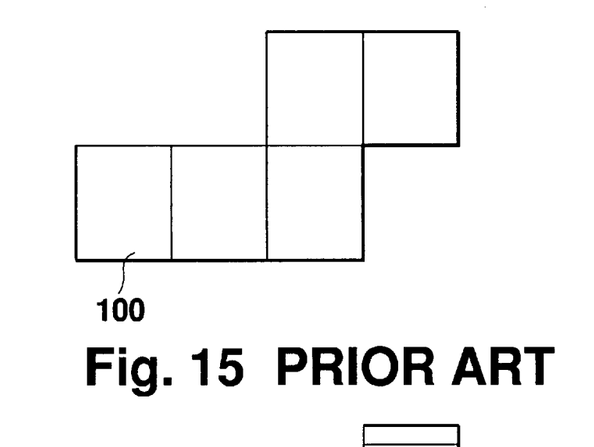
FIG. 15 is an enlarged view showing a part thereof.
Figure 16:
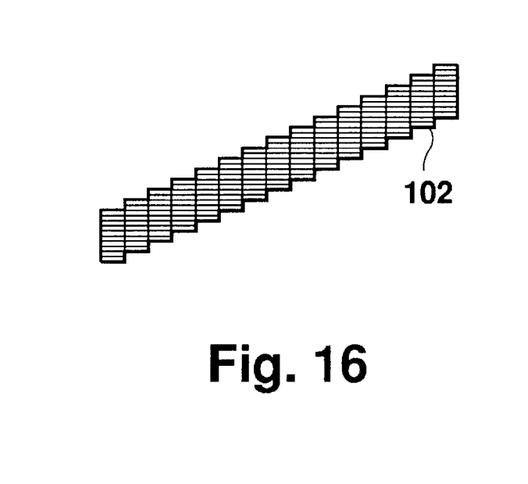
FIG. 16 shows a slant ruled line printed in the second example of an apparatus according to the embodiment shown in FIG. 7
Figure 17:
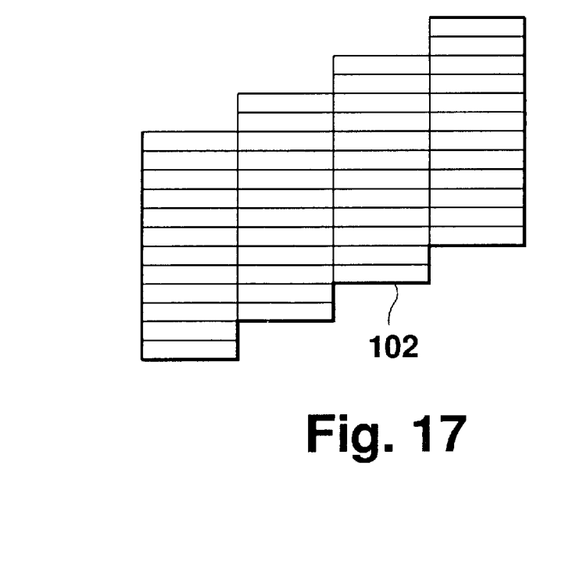
FIG. 17 is an enlarged view showing a part thereof.

Further, when a slant ruled line is printed, a smoother outline can be obtained in the present example. In a conventional LED printer, the light emitting area per dot is fixed, as shown in the magnified scale in FIG. 15, and hence it is difficult to obtain a smoothed outline, as shown in FIG. 14. On the contrary, in this example, as shown in enlarged scale in FIG. 17, it can be selected whether or not each area adjusting element 102 within one dot 100 is light-emitted, and thus a smoothed outline can be obtained, as shown in FIG. 16.

In this case, it is clear that these effects become remarkable as the area adjusting element number N per dot is determined to a sufficiently small value.

As described above, according to the present invention, the sub scanning direction dimension of the light emitting body is determined to be small, for example, at most ½ of the main scanning direction dimension, and the switching of the light emitting operation of the LED array is carried out by the signal having the period equal to the time required for moving the photosensitive body surface at the distance equivalent to the dimension of the sub scanning direction of the LED array. Hence, the energy distribution on the photosensitive body surface along the sub scanning direction is made uniform and the LED printer with high dot definition can be obtained.

Further, according to the present invention, the serial data are supplied and latched in synchronism with the signal used for the aforementioned switching, and one dot is divided into a plurality of area adjusting elements along the sub scanning direction. Hence, a smoother outline can be obtained.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A printer comprising:

a light emitting body comprising a plurality of light emitting elements arranged in a first direction, said light emitting body having a predetermined size in a second direction substantially perpendicular to the first direction;

a photosensitive body movable relative to said light emitting body and having a photosensitive surface to be sensitized by light emitted by the light emitting body, the photosensitive surface being moved relative to the light emitting body at a predetermined distance in the second direction, the first direction being orthogonal to the direction of relative movement of the photosensitive surface and parallel to the photosensitive surface; and a controller, operatively coupled to the light emitting body, for controlling light emission from the light emitting body such that the light emitting body emits light a predetermined number of times, the predetermined number of times being greater than one, at a predetermined period while the photosensitive surface moves a predetermined distance along the second direction relative to the light emitting body, said predetermined period being set based on a time required for moving the photosensitive surface along the second direction relative to the light emitting body, wherein said controller uses a strobe signal having first and second states to form overlapping light emission pulses in accordance with the predetermined size of the light emitting body in the second direction by activating light emission from the light emitting body in response to the first state of the strobe signal and deactivating light emission from the light emitting body in response to the second state of the strobe signal, resulting in a substantially flat energy distribution on the photosensitive surface.

2. The printer of claim 1, wherein a dimension of the light emitting body along the second direction is smaller than a dimension of the light emitting body along the first direction.

3. The printer of claim 2, wherein the dimension of the light emitting body along the second direction is at most ½ of the dimension of the light emitting body along the first direction.

4. The printer of claim 1, wherein the light emitting body is an LED array including a plurality of LEDs aligned along the first direction.

5. The printer of claim 1, wherein the control means includes means for causing the light emitting body to emit the light in a different pattern along the first direction, and said means for causing the light emitting body to emit the light in a different pattern causes the different pattern each period.

6. The printer of claim 1, wherein said predetermined period is set based on a time required for moving a photosensitive drum relative to the light emitting body.

7. A method of driving a light emitting body in a printer, the printer including a light emitting body having a plurality of light emitting elements arranged in a first direction and a photosensitive body movable relative to said light emitting body having a photosensitive surface to be sensitized by light emitted by the light emitting body, the photosensitive surface being moved relative to the light emitting body at a predetermined distance in a second direction substantially perpendicular to the first direction, the first direction being orthogonal to the direction of relative movement of a photosensitive surface and parallel to the photosensitive surface, the driving method comprising:

a) activating light emission from the light emitting body in response to a first state of a strobe signal and deactivating light emission in response to a second state of the strobe signal;

b) repeating said activation and deactivation a predetermined number of times, the predetermined number of times being greater than one, for a predetermined period while the photosensitive surface is moved a predetermined distance along the second direction relative to the light emitting body to form overlapping light emission pulses, resulting in a substantially flat energy distribution on the photosensitive surface;

the predetermined period corresponding to a time required for moving the photosensitive surface in the second direction relative to the light emitting body by a distance substantially equal to a size of the light emitting body in the second direction;

c) storing data including a bit number corresponding to each of the light emitting bodies and representing a photosensitive pattern to be formed on a photosensitive body;

d) permitting or inhibiting the supply of stored data to the corresponding light emitting element; and e) controlling the step of permitting or inhibiting based on a strobe signal.

8. The driving method of claim 7, wherein the dimension of the light emitting body along the second direction is smaller than a dimension of the light emitting body along the first direction.

9. The driving method of claim 8, wherein the dimension of the light emitting body along the second direction is at most ½ of the dimension of the light emitting body along the first direction.

10. The driving method of claim 7, wherein the light emitting body is an LED array including a plurality of LEDs aligned along the first direction.

11. The driving method of claim 7, further comprising the step of supplying data representing a different pattern along the first direction for every predetermined repeated period to the light emitting body to emit the light.

12. A light emitting diode printer, comprising:

a light emitting diode array having a plurality of light emitting diodes aligned along a main scanning direction, said light emitting diode array having a predetermined size in a sub scanning direction substantially perpendicular to the main scanning direction;

a photosensitive body movable relative to said light emitting body and having a photosensitive surface to be sensitized by light emitted by the light emitting diodes, the photosensitive surface being moved relative to the light emitting diode array in the sub scanning direction;

a driver circuit including:

means for converting serial data representing a printing pattern along the main scanning direction into parallel data at a predetermined rate;

means for latching the parallel data in response to a latch signal;

means for allowing the light emitting diodes to selectively emit the light based on the latched parallel data;

means for supplying a strobe signal having first and second states; and means for permitting an execution of the allowing means when the strobe signal is supplied and inhibiting the execution of the allowing means when the strobe signal is not supplied;

means for controlling light emitting operations of the light emitting diode array by supplying at least the latch signal and the strobe signal to the driver circuit at a predetermined timing, the control means generating the strobe signal a predetermined number of times, the predetermined number of times being greater than one, at a predetermined period while the photosensitive body is moved the predetermined distance with respect to the light emitting diode array, wherein said means for controlling uses the strobe signal to generate a substantially flat energy distribution on the photosensitive surface by:

setting the predetermined period in accordance with a time required for moving the photosensitive surface relative to the light emitting diode array by a distance substantially equal to the predetermined size of the light emitting diode array in the sub scanning direction, and activating light emission from the light emitting body in response to the first state of the strobe signal and deactivating light emission in response to the second state of the strobe signal to form overlapping light emission pulses;

shift register means for storing data which include a bit number corresponding to each of the light emitting bodies and represent a photosensitive pattern to be formed on a photosensitive body;

gating means for permitting or inhibiting the supply of data stored by the shift register means to the corresponding light emitting element; and controlling means for providing a command to the gating means with a strobe signal.

13. The light emitting diode printer of claim 12, wherein the control means generates the latch signal in synchronism with the strobe signal.

14. The light emitting diode printer of claim 12, wherein the photosensitive body is a photosensitive drum having a cylindrical form, and the predetermined distance is a dot pitch.

15. The light emitting diode printer of claim 12, wherein a dimension along the sub scanning direction of the light emitting diode array is smaller than a dimension along the main scanning direction.

16. The light emitting diode printer of claim 15, wherein the dimension along the sub scanning direction of the light emitting diode array is at most ½ of the dimension along the main scanning direction.

17. The light emitting diode printer of claim 12, wherein the control means supplies the serial data to the driver circuit at each predetermined period.

* * * * *